United States Patent [19]

Fiebig et al.

[11] Patent Number: 4,716,304
[45] Date of Patent: Dec. 29, 1987

[54] DRIVER CIRCUIT FOR HIGH-VOLTAGE POWER TRANSISTORS PROVIDING PROTECTION TO THE DRIVER TRANSISTORS

[75] Inventors: Arnim Fiebig, Leinfelden; Rupert Weber, Schneeberg, both of Fed. Rep. of Germany

[73] Assignee: Robert Bosch GmbH, Stuttgart, Fed. Rep. of Germany

[21] Appl. No.: 876,699

[22] Filed: Jun. 20, 1986

[30] Foreign Application Priority Data

Jun. 22, 1985 [DE]  Fed. Rep. of Germany ....... 3522429

[51] Int. Cl.$^4$ ...................... H03K 17/60; H03K 3/26; H03K 19/24
[52] U.S. Cl. .................................. 307/270; 307/254; 307/255; 307/311
[58] Field of Search ................ 307/270, 254, 255, 311

[56] References Cited

U.S. PATENT DOCUMENTS 4,075,511  2/1978  Lewis .
4,345,164  8/1982  Gies ..................................... 307/270

FOREIGN PATENT DOCUMENTS 3028054  2/1982  Fed. Rep. of Germany .
3215009  12/1983  Fed. Rep. of Germany .

Primary Examiner—Stanley D. Miller
Assistant Examiner—B. P. Davis
Attorney, Agent, or Firm—Frishauf, Holtz, Goodman & Woodward

[57] ABSTRACT

For driving each power transistor of a three phase bridge rectifier for utilizing d.c. electric power for the control and energization of a motor, each individual power transistor is provided with an individual driver circuit supplied an individual power supply. Each power transistor in such a rectifier has a reverse voltage free wheeling diode connected between emitter and collector. Each individual driver circuit has its input control signal supplied through a galvanic isolation stage in the form of an optical coupler and the power supply has its input connection to a source of power galvanically isolated by a transformer, supplying a relatively high frequency for powering the rectifier of the driver power supply. The final driver stage utilizes Darlington transistor combinations of complementary types, one Darlington combination being supplied with negative voltage and the other being supplied with positive voltage, by the power supply rectifier. The intermediate neutral voltage of the rectifier is connected galvanically to the emitter of a power transistor and the output connection coming from the junction of the two Darlington combinations is connected to the base electrode of the power transistor. The collector of the power transistor is connected to the control logic state that controls the driver input, this connection being made through a diode (60) for preventing the power transistor from being turned on while the reverse relief diode of the power transistor is conducting. The control logic circuit has a first bistable circuit (35) for setting the on periods of the driver and power transistor and a second bistable circuit (51,53) for registering an error condition and responding thereto by preventing the setting of the first bistable circuit.

13 Claims, 5 Drawing Figures

F I G. 1
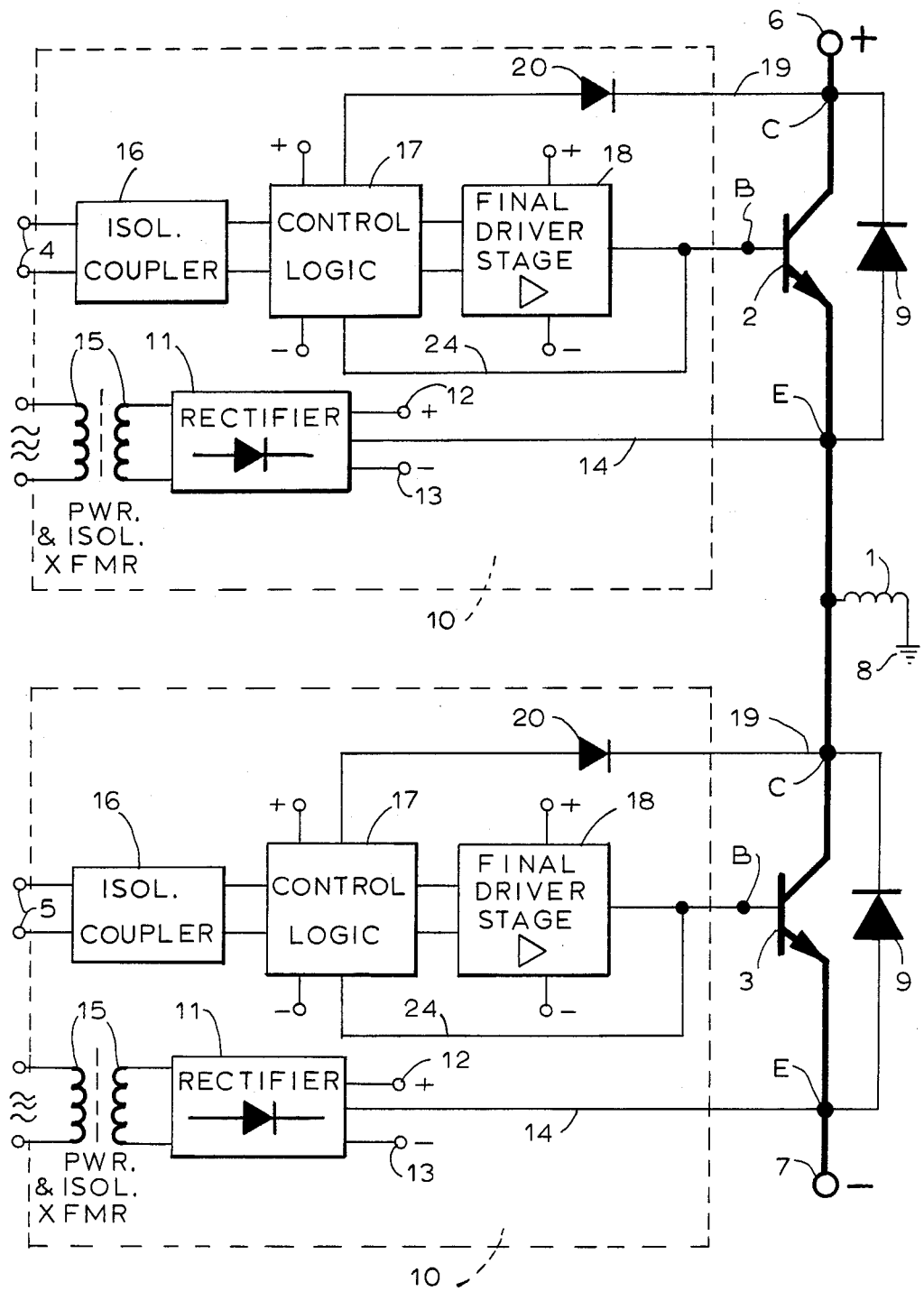

DRIVER CIRCUIT FOR HIGH-VOLTAGE POWER TRANSISTORS PROVIDING PROTECTION TO THE DRIVER TRANSISTORS

This invention concerns a circuit for driving a switching-type controller equipped with high-voltage power transistors which incorporate a protective circuit against overcurrent and false switching of the power transistor.

High-voltage power transistors can be operated, for example, as switching transistors at high frequency in direct connection to a rectified electric power distribution supply and driven at high efficiency in such service. These advantages do not hold, however, for the driver circuit which usually is constructed with low-voltage transistors and integrated circuits which have a much lower tolerance of overvoltage but must nevertheless be galvanically connected with the power transistors for turning them on and off. In order to make possible reliable operation of drivers for high-voltage transistors, expensive protective circuits are necessary in order to prevent major damage in the case of a failure.

A multiplicity of circuit arrangements and protective circuits are known for reliable operation of power switching transistors which prevent false switching or overloading of the power transistors (e.g. U.S. Pat. Nos. 3,938,008 and 4,375,074, and Published German Patent Applications (OS) Nos. 32 15 009 and 30 28 054). If several circuits of these kinds are combined, however, mutual interactions readily arise which can make portions of the protective circuits ineffective or give rise to other malfunctions.

SUMMARY OF THE INVENTION

It is an object of this invention to provide unambiguous switching conditions for the high-voltage power transistors in the driver circuit and equip the circuit with combined error monitoring features which mutually complement each other and do not disadvantageously interact with each other, while being to a great extent insensitive to disturbances.

Briefly, the reference potential for the driver circuit of each high-voltage power transistor is connected to the emitter of that power transistor, the base of the power transistor is supplied with a correspondingly poled switch-on voltage during the switch-on operation and with a correspondingly poled blocking voltage during the switch-off operation, a bistable multivibrator serving for drive signal storage is connected at the input of each driver circuit and its setting or resetting determines the switched on or switched off condition of the power transistor, input switch signals are supplied to one input of the bistable drive multivibrator through a potential isolating stage or device, a second multivibrator is provided for registry of error signals which is set when the voltage between emitter and collector or between base and emitter of the high-voltage power transistor exceeds a predetermined voltage level, when the control storage multivibrator is reset or the input switching signals are blocked through the potential isolation stage or device, or both, at which time the error storage multivibrator is set, and a blocking stage is connected through a diode to the collector of the high-voltage power transistor which prevents setting of the control signal storage multivibrator so long as current flows through a diode connected in parallel to the high-voltage power transistor for short-circuiting reverse voltage surges.

It is desirable for the blocking stage to be controlled by monitoring the emitter-collector voltage of the high-voltage transistor and to respond when a reverse current diode is conducting current or when the high-voltage transistor is driven into saturation.

It is also desirable for a timing circuit to be provided at the input of the error registry multivibrator which sets that multivibrator if after a predetermined time interval after setting of the control multivibrator storage circuit the high-voltage transistor fails to reach its saturation condition and/or remains beyond this interval in an unsaturated condition.

It is useful to provide as the timing circuit an RC network at the output of the blocking stage of which a capacitor changes its charge upon deactivation of the blocking stage during the switching-on operation or during unsaturation of the power transistor and for the change of charge to set the error registry multivibrator after a switching threshold is passed, so long as the change of charge is not previously reversed by activation of the blocking stage.

It is advantageous to provide a circuit for monitoring the base-emitter voltage of the high-voltage power transistor for immediately resetting the control signal storage multivibrator and/or setting the error registry multivibrator when a predetermined voltage between base and emitter is exceeded.

It is also advantageous to constitute the error registry multivibrator as a self-locking device so constituted that once it is set it can be deactivated only by a switching off of its supply voltage.

Preferably the potential isolation stage or device is an optoelectric coupler which obtains its supply voltage through an output of the error registry multivibrator. Preferably the output transistor of the optoelectric coupler is connected in a common collector circuit in which the emitter reference voltage is obtained from an output of the error storage multivibrator. It is desirable that when as a result of failure the driver supply voltage drops, the error registry multivibrator is set by the voltage monitoring device for the emitter-collector voltage and/or the base-emitter voltage.

Finally, it is advantageous for the high-voltage power transistors to operate in a bridge circuit and for a driver circuit to be provided for each high-voltage power transistor which is potential-isolated, which is to say galvanically separated, from each of the other drive circuits and that isolation and separation capable of withstanding high voltage should be provided in each case in the potential isolating stage located ahead of the input of the control signal storage multivibrator and that the supply voltage generation for each driver circuit should be supplied in the case of each drive circuit through a transformer operating at relatively high frequency.

BRIEF DESCRIPTION OF THE DRAWINGS

The invention is further described by way of illustrative example with reference to the annexed drawings, in which FIG. 1 is a circuit block diagram of the circuit of a first embodiment of the invention;

DESCRIPTION OF THE ILLUSTRATED EMBODIMENTS

Figure 2:
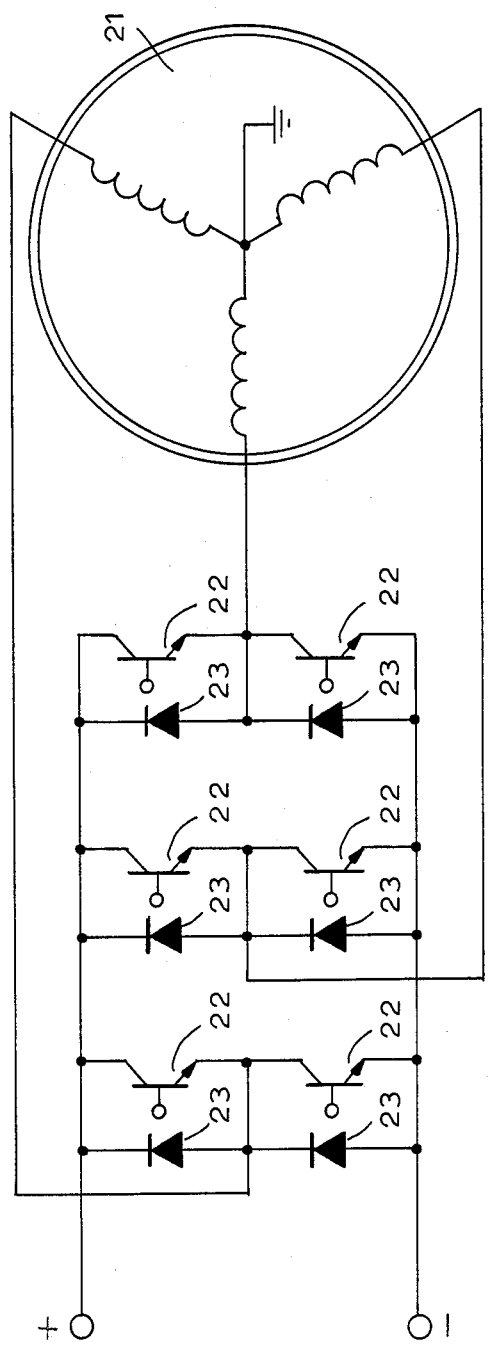
FIG. 2 is a circuit block diagram of the circuit of a second embodiment of the invention.

FIG. 1 shows an inductive load 1 connected between the neutral center tap 8 of a d-c voltage source having a positive pole 6 and a negative pole 7 and the common connection of two high-voltage power transistors 2 and 3 through which the inductive load 1 is connected respectively to the positive pole 6 and the negative pole 7 of the d-c voltage source. The d-c voltage source can provide direct current at a voltage of several hundred volts. Diodes 9 are respectively connected in parallel to the transistors 2 and 3 for preventing reverse voltages from building up across the transistors, as is commonly done for switching of a load that may be inductive.

The control of the switching of the high-voltage power transistors 2 and 3 is produced in separate mutually isolated driver circuits 10 which are of identical design and mode of construction. They each have a separate voltage supply part 11 producing a positive d-c voltage on the line 12 and a negative d-c voltage on the line 13 with reference to a neutral conductor 14. The neutral conductor 14 is connected directly to the emitter E of the high-voltage power transistors, with the result that the supply voltages 12 and 13 and accordingly also the potential of the individual stages of the driver voltage 10 remain in a direct relation to the instantaneous emitter voltage. The voltage supply components 11 are galvanically separated from each other by their respective input transformers 15 which are preferably all supplied with a high-frequency alternating current, which may come from a common source, the choice of a high-frequency making possible a small construction bulk with an isolation between primary and secondary windings of the transformer which can withstand high voltage.

The control signals 4 and 5, produced from a common control components not shown in the drawing, are supplied with galvanic isolation by virtue of the potential isolation devices 16 respectively to the switching control logic circuits 17 serving the individual driver final stages 18. The output of each driver final stage 18 is directly connected to the base B of the particular high-voltage power transistor, in one case the base of the power transistor (2 or 3 as the case may be) and supply, for the switch-on operation, a prescribed positive switch-on voltage with reference to the emitter potential present on the connection line 14 of the driver circuit and, in the case of a switch-off operation, a prescribed negative blocking voltage. The protection circuits of importance for the invention provided in the switching control logic 17 where the voltages present at the base B and the collector C of the high-voltage power transistor, made available respectively through the connection 24 and through the connection 19 and the diode 20 are monitored and evaluated. A more precise explanation of this part of the circuit is made further below in the description of FIG. 3.

FIG. 2 illustrates a more specific example of the application of the invention in which a servo motor 21 is controlled through six high-voltage power transistors 22 each of which has a reverse voltage suppression diode 23. The six power transistors 22 are disposed in three bridge branches between the positive and negative pole of the d-c voltage source which can typically be constituted by direct rectification of the voltage of an alternating current power line. The control switching of the two power transistors of one bridge branch can in each case be produced by driver circuits 10 constituted in accordance with the invention as shown in FIG. 1.

The generation of the input signals for the driver circuit constituted in accordance with FIGS. 1 and 2 can be produced in known control components which operate after the manner of switching type regulators or controllers, for example by pulse width modulation of high-frequency pulses for controlling the magnitude of current through the load 1 in the case of FIG. 1 or the windings of the servo motors 21 and the direction of the current through the various windings by corresponding selection of the particular power transistors to be pulses, always observing the requirement that one power transistor of each individual bridge branch must always be blocked. In such control components protective circuits are usually incorporated which prevent the generation of switch-on signal for one transistor of a bridge branch so long as the other power transistor of the same bridge branch in conducting.

Figure 3:
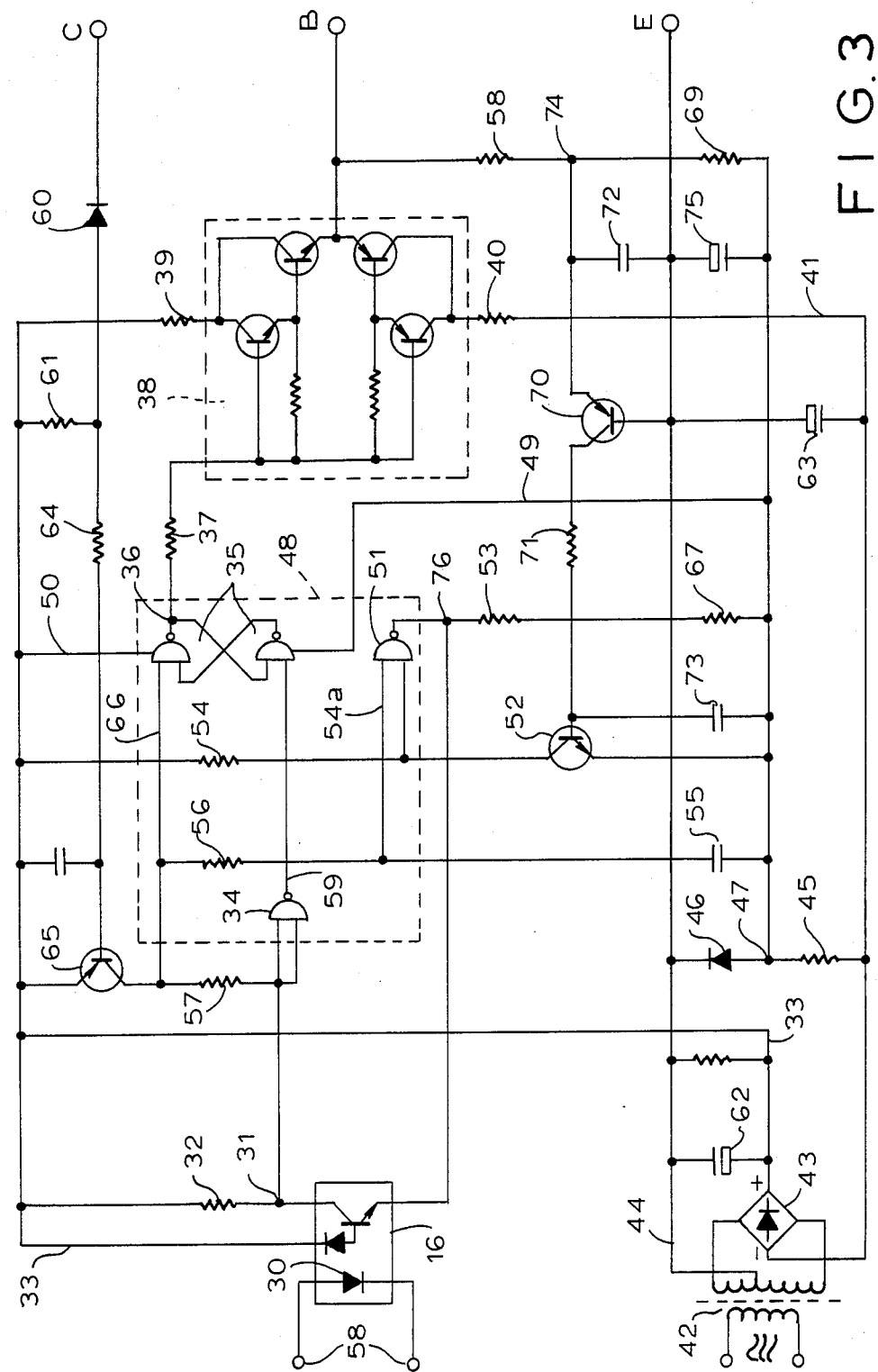
FIG. 3 is a circuit block diagram illustrating an example of a driver circuit according to the invention.

FIG. 3 shows one of the driver circuits 10 of FIG. 1 in which the potential separation stage 16 consists of an opto-electric coupler in which the input signals are applied to a light emitting diode (LED) 30. The collector output 31 of the photosensitive side of the coupler is connected through a load resistor 32 to the positive driver voltage supply line 33 and to the input of an inverter 34, of which the output is supplied to one input of a bistable multivbrator 35. One output 36 of the multivibrator 35 is connected through a resistor 37 to the input of a driver final stage 38 composed of two npn switching transistors and two pnp switching transistors. This driver final stage is constituted in a well known way of two npn and pnp Darlington circuits connected together in a half bridge complementary drive circuit in which the respective collector pairs are connected through low value resistances 39 and 40 respectively to the positive voltage supply line 33 and the negative voltage supply line 41 of the driver power supply 42, 43. The output to which the emitters of two of the driver transistors are connected is supplied to the base B of the high-voltage power transistor.

The driver power supply is produced through a high-frequency transformer 42 having a center tap secondary winding and a bridge rectifier 43. A reference neutral potential is taken from the center tap of the transformer secondary, over a neutral conductor 44 directly to the emitter terminal E of the high-voltage power transistor. The output voltage of the bridge rectifier 43 is filtered by electrolytic capacitors 62 and 63 and the negative voltage produced is stabilized to a lower value by means of the series connection of a resistor 45 and a Zener diode 46. This smaller negative voltage available at the junction point 47 of the series circuit just mentioned, which is stabilized and smoothed by an electrolytic capacitor 75 is supplied over a line 49 as negative supply voltage for an integrated circuit 48 comprising four NAND-gates.

This integrated circuit 48 receives its positive supply voltage over the line 50. These two supply voltages determine the output voltages from time to time of the four NAND-gates. Three of the NAND-gates are used for the inverter 34 and the multivibrator 35, while the fourth NAND-gate 51 is part of a self-maintaining multivibrator 51 that operates as the error register. For this purpose it cooperates with an npn transistor 52 having its collector at one input of the NAND-gate 51, the output 76 of which is connected through a resistance 53 with the base of the transistor 52.

Figure 4:
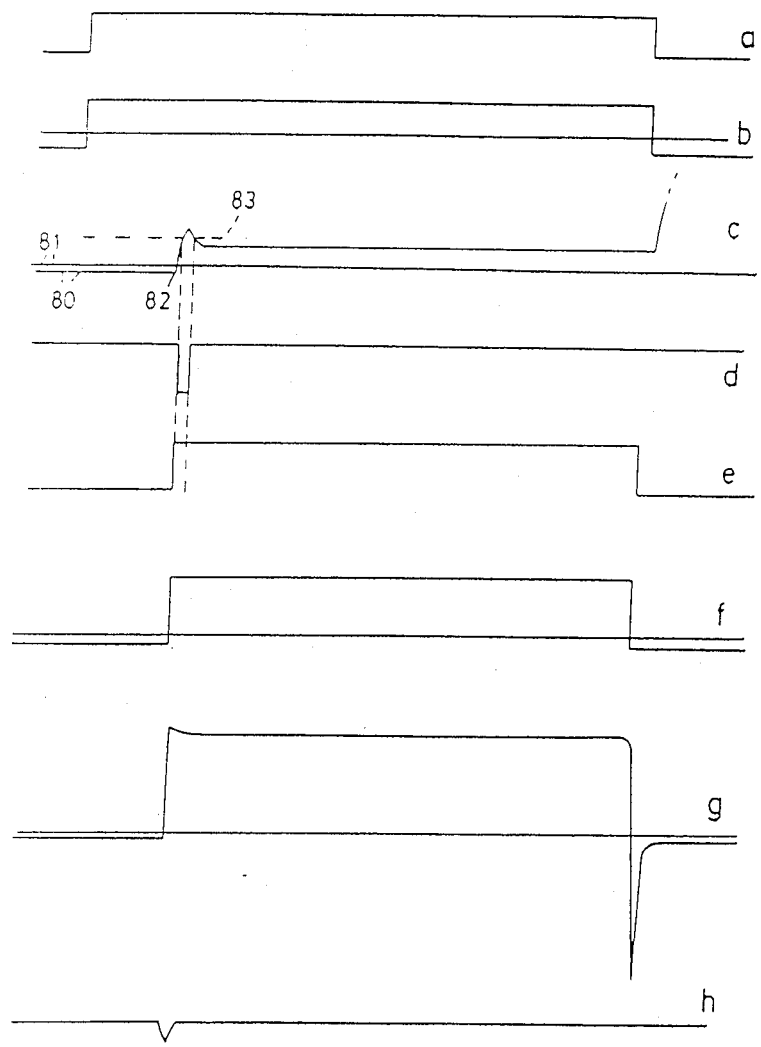
FIG. 4 is a graph of voltages and currents plotted against time which appear in operation of the circuit of FIG. 3.

The emitter of the transistor 52 is connected to the junction tap 47 for the stabilized negative supply voltage and its collector is connected through a resistance 54 to the positive driver voltage supply 33. The manner of operation of this circuit will be explained in connection with the course of voltages plotted in FIGS. 4 and 5. When the supply voltage is switched on, the multivibrator 35 is reset through the inverter 34, i.e. the output 36 goes low. The output of the NAND-gate 51 likewise is set at low, as soon as the capacitor 55 connected to its input 54a is charged through the resistor 54 with respect to the stabilized negative voltage to which the other terminal of the capacitor 55 is connected at the junction point 47. The other end of the resistance 56 is connected through another resistance 57 to the collector output 31 of the optoelectric coupler and from there through still another resistor 32 to the positive driver supply voltage line 33. If now an input signal as shown on line a of FIG. 4 is applied to input 58 of the potential isolating stage 16, for a signal value zero, there is a positive voltage at the collector output 31 and, as shown in line b of FIG. 4, a negative voltage at the output 59 of the inverter 34. The output 36 of the multivibrator 35 also remains at this negative voltage and therfore applies through the driver final stage 38 a corresponding negative blocking voltage on the base B of the high-voltage power transistor. If a switch-on signal is present at input 58, the output 59 of the inverter becomes positive, as the result of which the output 36 of the multivibrator 35 can be set.

The setting of the multivibrator 35 is prevented, however, by a blocking circuit if current is flowing through the reverse voltage free wheeling diode 9 connected in parallel with the high-voltage power transistor (FIG. 1). Such a current flows through that diode when the emitter voltage is more positive than the collector voltage. In this case, a current flows from the positive driver voltage line 33 over a resistor 61 and over a diode 60 having its cathode connected to the collector terminal C. This current is made possible because the reference line 44 of the driver voltage supply is connected to the emitter and thus, as shown in line c on FIG. 4, the collector voltage 80 is lower than the reference voltage 81. As a result of the voltage drop across the resistance 61, the effect of which is brought through a further resistance 64 to the base of a pnp blocking transistor 65, that blocking transistor is put into conducting condition and applies the positive driver supply voltage which is present at its emitter extensively to the second input 66 of the multivibrator 35 and to the circuit junction of the resistors 56 and 57 which are connected to the inputs 66. The second input 66 of the multivibrator 35 is thereby held at so positive a value of voltage that the multivibrator 35 cannot cause its ouput 36 to be switched high.

After the termination of the current through the freewheeling diode at the instant 82 shown in line c of FIG. 4, the blocking transistor 65 becomes blocking as soon as the emitter voltage of the high-voltage power transistor relative to the collector voltage has fallen to a value that corresponds approximately to the positive driver supply voltage (line 33). At the input 66 of the multivibrator 35 the voltage then falls as shown in line d of FIG. 4 and at the output 36 there is found, as shown in line e of FIG. 4, a positive voltage which sets the output of the driver final stage to a positive voltage as shown in line f of FIG. 4. In consequence the high-voltage power transistor is made conducting and a current flows as shown in line g of FIG. 4.

When the high-voltage power transistor is thus switched on, the voltage between its terminal C and E breaks down to very low values so that the voltage drop is smaller than the voltage 83 of the positive current supply 33. In consequence, a current flows again through the diode 60 and the resistor 61 which makes the blocking transistor 65 conducting anew and again raises the voltage at the inputs 66 of the multivibrator 35. The capacitor 55 connected through the resistance 56 to this input is soon discharged in an exponential manner as shown in line h of FIG. 4, but is immediately after charged up again following the switching on of the high-voltage power transistor, so that its voltage at no time sinks to values that could produce a blocking of the gate 51.

If as a result of a failure in the control circuit or the load circuit of the high-voltage power transistor by which it is switched either not fast enough or not to a sufficient extent into the saturation region of its characteristic, the capacitor is again discharged and the NAND-gate 51 is thereby blocked. The output 76 of this NAND-gate 51 and the emitter output of the optoelectric coupler connected with it is then switched to a positive potential as the result of which not only is the potential isolating stage 16 blocked, but the collector output 31 is also put without delay at a positive potential. In consequence, the output 59 of the inverter goes to negative potential and resets the multivibrator 35. Since the output 76 of the NAND-gate 51 connected to a voltage divider composed of two resistances 53 and 67 at the junction of which the base of the transistor 52 is connected, the latter transistor is simultaneously made conducting and then applies the negative potential to the second input of the NAND-gate 51. The error register formed by the NAND-gate 51 and the transistor 52 then remains set, independently of what potential the capacitor 55 at the input 54a of the NAND-gate may have. Resetting of the error register becomes possible only after a switching off and on again of the supply voltage.

Figure 5:
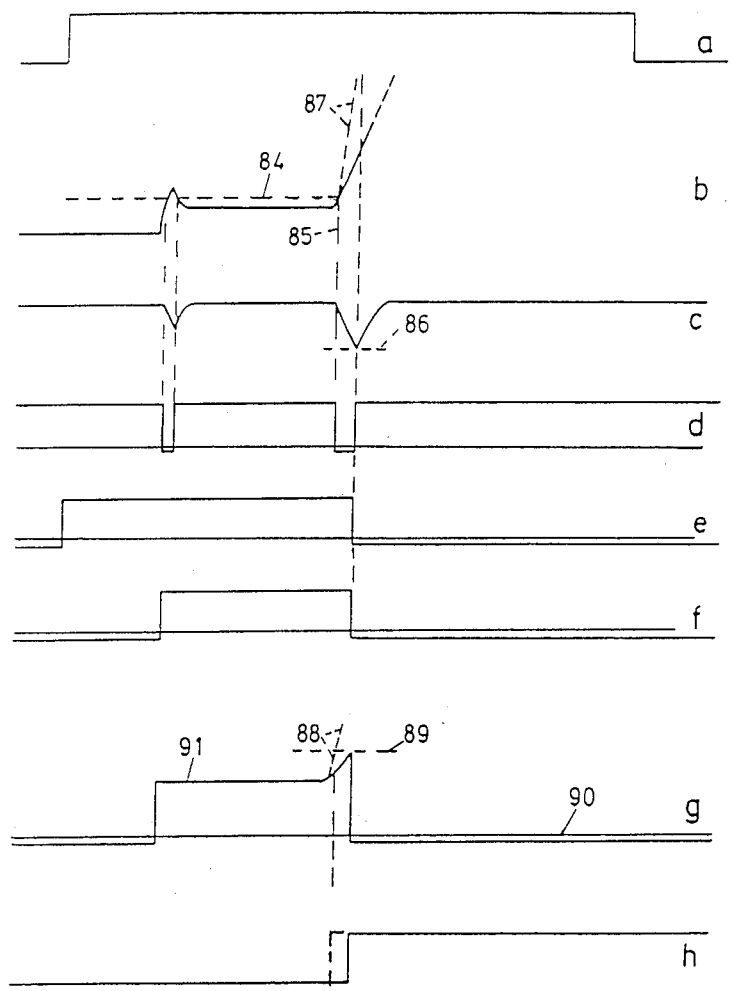
FIG. 5 is a graph similar to FIG. 4 showing the course of voltages in the case of a failure.

Such a failure shutdown takes place also as shown in FIG. 5 when a short circuit or an overload excessively unsaturates the high-voltage power transistor. If the emitter to collector voltage of this transistor exceeds the blocking potential 84, no current flows any more through the diode 60, so that from the instant 85, as shown on line c of FIG. 5, the capacitor 55 is discharged and sets the error register when its voltage goes below a switching level 86. The discharge takes place over the resistances 56 and 57 since the transistor 65 is in its high-resistance condition and a negative voltage shown in line d of FIG. 5 is present at its collector output 31. With the setting of the error register, the output 59 of the inverter 34 also goes negative as shown in line e of FIG. 5 and the output 36 of the control storage multivibrator is reset as shown in line f of FIG. 5.

In case of normal operation, the voltage at the base terminal B is determined to a great extent by the output voltage of the driver final stage 38. If however desaturation of the high-voltage power transistor takes place, e.g. as the result of overcurrent, the base-emitter voltage rises in a manner similar to the emitter-collector voltage even though in somewhat smaller measure, as this is shown in line g of FIG. 5. If a rapid desaturation 87 as shown in line b of FIG. 5 takes place, for example as the result of a short circuit, there is produced an approximately equally rapid rise 88 of the base voltage. This base voltage is now monitored by a supplementary circuit which is connected between the base terminal B and the junction point 47 at which the stabilized negative driver supply voltage is provided by a voltage divider consisting of two resistances 68 and 69, this junction point being connected with the emitter of another pnp transistor 70. The base of the transistor 70 is connected to the emitter terminal E and the collector is connected through a resistance to another input of the error register, namely to the base of the transistor 52.

If now the voltage at the base terminal B rises above a value 89 (line g of FIG. 5) set by the voltage divider 68, 69, the two transistors 70 and 52 become conducting and the error register is set without delay, as the result of which the output 76 takes on a high potential as shown in line h of FIG. 5. Transient harmless disturbance peaks can be made ineffective by means of the filter capacitors 72 and 73.

The circuit according to FIG. 3 switches on and off a high voltage power transistor by positive and negative switching voltages prescribed by the control signal storage multivibrator 35. This circuit protects the high-voltage power transistor to a great extent against overloads and against failures in the control circuit or in the load circuit. Even faults in the driver supply voltage lead to a shutting down of the high-voltage power transistor. Thus in the case of a diminished positive driver supply voltage 33, the blocking potential 84 is lowered so that the error register responds before the high-voltage power transistor reaches the desaturation region. The desaturation monitoring and the other protective circuits remain fully capable of operation up to that point.

If the stabilized negative driver supply voltage drops back at the junction tap 47, this in the first place operates, through the anchoring point of the resistance 69 on the tap 74 of the voltage dividers 68, 69 across which the base-emitter voltage B to E is picked off. The voltage at the tap 74 thus becomes more positive, switches on the pnp transistor earlier and sets the error register already at lower overcurrents, as previously described, or in the case of a further voltage drop in the case of switching on or of an already switched-on high-voltage power transistor. As shown in line g of FIG. 5, this works out as if the zero level had been raised until the voltage 91 for a conducting high-voltage power transistor reaches the value 89.

The circuit according to FIG. 3 is shown for the case of an npn high-voltage power transistor. By corresponding changes in the circuit a corresponding circuit operating in the same way for pnp power transistors can be constituted. According to the requirements or the particular applications it can be advantageous for the error register to be reset automatically by a signal or, for example, in the case of over-currents to make the switching-on of the high-voltage power transistor to be reversed only briefly so that current limiting results.

It will therefore be understood that although the invention has been described with reference to particular illustrative examples, modifications and variations are possible within the inventive concept.

The power frequency transmitted through the isolating transformer 15 may be any of the power frequencies used for lightweight d-c to a-c "inverters" commonly used, for example in aircraft, for example 400 Hz, 800 Hz or 1600 Hz.

We claim:

1. Driver circuit means for an even plurality of high voltage power switching transistors each having a switchable path between collector and emitter thereof and a base electrode for switching control of said path and each having a free wheeling diode connected antiparallel to said switchable path of said power switching transistor, said even plurality of power switching transistors having their respective switchable paths connected in cascade between positive and negative poles of a d.c. voltage source, and a load for said power switching transistors being connected between a midpoint of said cascade connection of power switching transistors and a conductor maintained at a potential midway between the respective potentials of said positive and negative poles of said source of d.c. voltage, comprising:

an individual driver circuit and an individual driver power supply unit for each said power transistor, each said driver circuit comprising a final driver stage (18, 38) a control logic stage (17, 48) and a first galvanic isolation input device (16), which is interposed between a source (4, 5) of switching control signals and an input of said control logic stage;

each driver power supply unit having a rectifier and a second galvanic isolation input device (15) interposed between said rectifier and a source of alternating current, said rectifier providing a reference potential output connection and at least one output connection providing a d.c. supply voltage with respect to said reference potential output connection, said reference potential output connection being connected galvanically to the emitter of the power switching transistor for which the power supply unit containing the rectifier providing said reference potential output is individual;

each said final driver stage being powered by a said power supply unit individual to the same power switching transistor and having an output galvanically connected to the base electrode of said same power switching transistor for which the driver circuit containing the final driver stage is individual;

each said driver circuit further comprising:

a first settable and resettable bistable circuit (35) in said control logic stage of each said driver circuit, connected so as to store said switching control signals and to determine and time switched-on and switched-off conditions of the power transistor for which the driver circuit is individual in accordance respectively with set and reset conditions of said first bistable circuit;

a second settable and resettable bistable circuit (51, 52) for registering error conditions and circuits associated therewith for setting said second bistable circuit in response to at least one of two voltage differences which are, namely, a first voltage difference between the emitter and collector of said power transistor exceeding a first predetermined value and a second voltage difference between base and emitter of said power switching transistor exceeding a second predetermined value while said first bistable circuit is set, and a blocking circuit including a diode connected to the collector of the said power switching transistor for which the driver circuit is individual for preventing the setting of said first bistable circuit so long as said free wheeling diode connected antiparallel to the said power switching transistor conducts current.

2. Driver circuit means according to claim 1, in which each said driver power supply unit has a rectifier providing, in addition to said reference potential output connection, a positive d.c. supply voltage with respect to said reference potential output connection and negative d.c. supply voltage with respect to said reference potential output connection, and in which each said final driver stage includes a pair of driver switching transistors of complementary conductivity types connected with their switchable paths in series between said positive supply voltage output and said negative supply voltage output of said driver power supply unit individual to the respective final driver stage, a series junction of the switchable paths of said pair of complementary type driver transistors being connected galvanically to the base electrode of the particular power switching transistor for which the driver circuit is individual so that said pair of complementary type driver transistors may be respectively energized by said positive and negative supply voltages to contribute current flowing additively from their respective switchable paths to said base electrode of said particular power switching transistor.

3. Driver circuit means according to claim 1, in which said blocking circuit of each said individual driver circuit is connected for preventing the setting of said first bistable circuit, not only so long as said free wheeling diode connected in parallel with said power transistor conducts current, but also while said high voltage power transistor is being driven into saturation.

4. Driver circuit means according to claim 1, wherein each said driver circuit includes a timing circuit at an input of said second bistable circuit for setting that second bistable circuit whenever said power transistor fails to reach its saturation condition after the lapse of a predetermined time interval after the setting of said first bistable circuit or remains in an unsaturated condition after the lapse of said predetermined time interval.

5. Driver circuit means according to claim 4, in which said timing circuit is an RC network at the output of said blocking circuit and comprises a capacitor connected for changing its charge upon deactivation of said blocking circuit when said power transistor is switched on or during unsaturation of said power transistor, and for setting said second bistable circuit in response to change of said capacitor after a switching threshold for the charge voltage is passed before reversal of the change of charge of said capacitor by activation of said blocking circuit.

6. Driver circuit means according to claim 1, in which said control logic circuit is constituted for immediately resetting said first bistable circuit when a predetermined voltage between base and emitter of said power transistor is exceeded.

7. Driver circuit means according to claim 1, in which said control logic circuit is constituted for immediately setting said second bistable circuit when a predetermined voltage between base and emitter of said power transistor is exceeded.

8. Driver circuit means according to claim 6, in which said control logic circuit is constituted for immediately setting said second bistable circuit when a predetermined voltage between base and emitter of said power transistor is exceeded.

9. Driver circuit means according to claim 1, in which said first galvanic isolation input device (16) in each individual driver circuit is an optoelectric coupler which obtains one supply voltage connection from an output connection of said second bistable circuit, whereby the set state of said second bistable circuit blocks transmission through said first galvanic isolation input device and resets said first bistable circuit.

10. Driver circuit means according to claim 9, in which said optoelectric coupler includes an output transistor with its collector connected to a load resistancse and to an output connection and its emitter to an output of said second bistable circuit connected for providing a reference voltage for the emitter of said coupler output transistor unless said second bistable circuit is set.

11. Driver circuit means according to claim 1, for a plurality of high voltage power switching transistors connected in cascade between positive and negative poles of a d.c. voltage source wherein the number of said high voltage power switching transistor connected in cascade is two.

12. Driver circuit means according to claim 11, in which said two power switching transistors connected in cascade are connected in cascade between positive and negative poles of a d.c. voltage source between which poles at least one more pair of high voltage power switching transistors are connected in cascade and are provided with driver circuit means likewise according to claim 11.

13. Driver circuit means according to claim 11, for a pair of high voltage power switching transistors connected in cascade between positive and negative poles of a d.c. voltage source between which poles two additional pairs of high voltage power transistors switching are connected in cascade and each of said additional pairs of power transistors are provided with driver circuit means likewise in accordance with claim 11.

* * * * *